United States Patent [19]
Shirahata

[11] Patent Number: 5,330,805
[45] Date of Patent: Jul. 19, 1994

[54] BLOW MOLDING AND ITS MOLDING PROCESS

[75] Inventor: Itaru Shirahata, Oobu, Japan

[73] Assignee: Tokai Kogyo Kabushiki Kaisha, Oobu, Japan

[21] Appl. No.: 878,502

[22] Filed: May 5, 1992

[30] Foreign Application Priority Data

May 15, 1991 [JP] Japan .................. 3-141069

[51] Int. Cl.⁵ .............................. B60R 13/04
[52] U.S. Cl. .................... 428/31; 52/716.5; 293/128; 428/67
[58] Field of Search ........... 428/31, 67; 52/716.5; 293/128

[56] References Cited

U.S. PATENT DOCUMENTS

| | | | |
|---|---|---|---|
| 3,072,969 | 1/1963 | Du Bois | 264/509 |
| 3,451,709 | 6/1969 | Swavger | 428/31 |
| 3,474,498 | 10/1969 | Hoppes | 425/190 |
| 3,550,197 | 12/1970 | Szajna et al. | 425/525 |
| 3,809,521 | 5/1974 | LaFosse | 425/526 |
| 4,059,471 | 11/1977 | Haigh | 428/195 X |
| 4,413,027 | 11/1983 | Bildl | 428/67 X |
| 4,418,033 | 11/1983 | Hatakeyama | 264/509 |
| 4,479,770 | 10/1984 | Slat et al. | 425/503 |
| 4,617,209 | 10/1986 | Ives | 428/60 |
| 4,639,341 | 1/1987 | Hanamoto et al. | 264/40.1 |
| 4,668,543 | 5/1987 | Schlenz | 428/31 |
| 4,687,804 | 8/1987 | Shiraishi et al. | 428/31 X |
| 4,857,258 | 8/1989 | Le Doux et al. | 264/515 |
| 4,948,637 | 8/1990 | Kessler | 428/31 |
| 5,096,753 | 3/1992 | McCue et al. | 428/31 |
| 5,194,305 | 3/1993 | Shirahata et al. | 293/128 X |

FOREIGN PATENT DOCUMENTS

| | | |
|---|---|---|
| 48-9579 | 3/1973 | Japan . |
| 56-84925 | 7/1981 | Japan . |
| 59-206241 | 11/1984 | Japan . |
| 60-143159 | 7/1985 | Japan . |
| 61-76343 | 4/1986 | Japan . |
| 62-4057 | 1/1987 | Japan . |
| 63-22123 | 6/1988 | Japan . |
| 63-252718 | 10/1988 | Japan . |
| 64-24722 | 1/1989 | Japan . |
| 1-196324 | 8/1989 | Japan . |
| 2-18026 | 1/1990 | Japan . |
| 2-57317 | 2/1990 | Japan . |
| 2-14994 | 4/1990 | Japan . |
| 1227083 | 3/1971 | United Kingdom . |

*Primary Examiner*—Henry F. Epstein
*Attorney, Agent, or Firm*—Oblon, Spivak, McClelland, Maier & Neustadt

[57] ABSTRACT

A blow molding is composed of a blow molded body with a hollow interior, an ornamental strip integrally bonded therewith on the outer surface thereof, and an end cap attached to both ends of the ornamental strip, which is free from warpage or forming a gap between the ornamental strip and the blow molded body owing to the change of temperature in use. The end cap is so attached to slide longitudinally to the ornamental strip, keeping a space between its end portion and an edge surface of the ornamental strip for accommodating the molding expansion. A fixture of the ornamental strip and the end cap are embedded in the blow molded body.

15 Claims, 7 Drawing Sheets

BLOW MOLDING AND ITS MOLDING PROCESS

BACKGROUND OF THE INVENTION

1. Field of the Invention

The present invention relates to a blow molding, in particular to the one provided with an ornamental strip on its outer surface, and its molding process.

2. Description of the Related Arts

Conventionally automobiles and ships are provided with long moldings on their side surfaces for protective and ornamental purposes. Automobiles are also provided with belt-like bumpers on their front and rear part for shock adsorbing function. Those molded products, moldings or bumpers as described above will be hereinafter referred to as a long molded product.

Some of those long molded products, generally produced through injection molding or extrusion molding, may be integrally bonded with an ornamental strip such as stainless or color resin tie plates on their outer surfaces for improving ornamental effects. Furthermore, long molded products with a hollow interior, formed by a blow molding process have been produced in increasing quanities because of their light weight and excellent shock absorbing function as disclosed in Japanese Patent Application Laid-Open No. 206241/1984, and Japanese Patent Publication No. 22123/1988.

The above molding is obtained through the blow molding process by integrally bonding the ornamental strip and the blow molded body, both of which are formed of totally different materials. After the blow molding, or while using the molding, warpage often occurs in its longitudinal direction, or a gap is formed between the blow molded body and the ornamental strip owing to different expansion ratio thereof.

The molding obtained through the blow molding process is hollow shaped, and generally formed of a synthetic resin. At blow molding, the tubular parison extruded from a die head will cause the molecular configuration to be aligned in the extrusion direction, the so called orientation phenomena. The molding, then largely expands in the longitudinal extruded direction of the parison. That is why the cavity of the die for blow molding is designed to have a longer length than the desired length of the molding, considering the amount of molding shrinkage. For example, in order to obtain the molding with its length of 1 m, the cavity of the die is designed to have its length of 1.014 m, which incorporates the molding shrinkage amount of 1.4%.

While using the molded product, since the synthetic resin used for the molded product and the material for the ornamental strip have different coefficients of linear expansion, they will independently expand to the change of outside temperature. At blow molding, the blow molded body is likely to shrink in its longitudinal direction due to molding shrinkage. The ornamental strip integrally bonded with the blow molded body, however, will prevent such shrinking, resulting in causing warpage in the longitudinal direction. While using the molding, a gap may be formed between the blow molded body and the ornamental strip because of the different coefficients of linear expansion, which adversely affects the appearance of the molding and further causes separation of the ornamental strip from the blow molded body.

SUMMARY OF THE INVENTION

Under these circumstances, it is an object of the present invention to provide a blow molding with no warpage and gap, and its molding process.

A blow molding is composed of a blow molded body with a hollow interior formed therein, an ornamental strip provided with an outer surface of the blow molded body, and an end cap attached to both ends of the ornamental strip. The ornamental strip is provided with a fixture in its longitudinal direction. The end cap is slidably provided with the ornamental strip to keep a space between its bottom and an edge surface of the ornamental strip. The fixture and end caps are embedded into the blow molded body.

Other features and advantages of this invention will be apparent from the following description and the accompanying drawings.

DETAILED DESCRIPTION OF THE INVENTION

Figure 1:
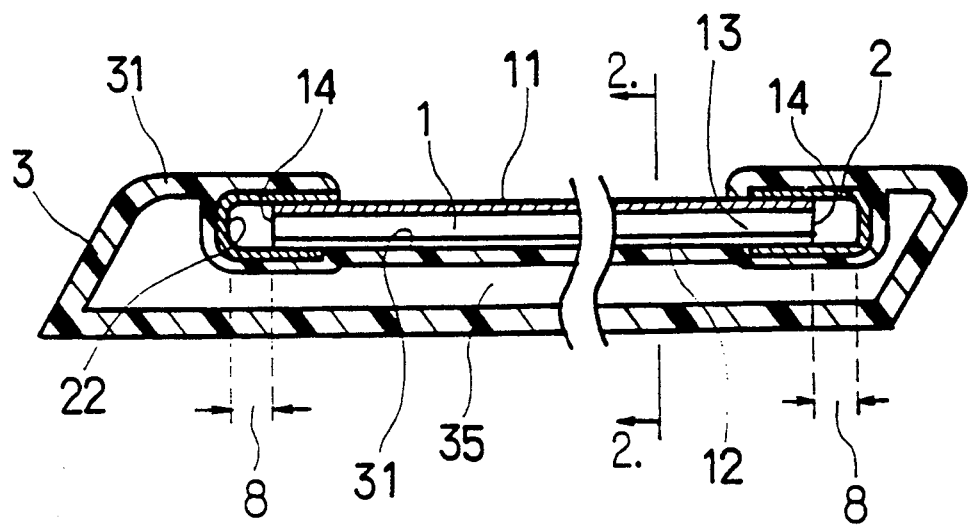
FIG. 1 ia a sectional view of the molding of Example 1.

The most salient feature of the present invention is a fixture provided with the ornamental strip in its longitudinal direction, and an end cap slidably mounted to keep a space in order to accommodate the expansion between its bottom and an edge surface of the ornamental strip. The fixture and end cap are embedded into the material of the blow molded body.

The above blow molded products, moldings and bumpers, are generally composed of a blow molded body with a hollow interior, and an ornamental strip integrally bonded therewith on the outer surface thereof for an ornamental purpose. The ornamental strip may be formed of a stainless steel, aluminum, chrome coated plate, and synthetic resin plate. The synthetic resin may be selected from the group of polyvinyl chloride, acrylic resin, and ionomer resin.

The integral bonding of the ornamental strip to the blow molded body is executed at blow molding by embedding the ornamental strip into the blow molded body, leaving the ornamental (outer) surface. The fixture of the ornamental strip is also embedded into the blow molded body in order to fix it in position.

The end caps are attached to both ends of the ornamental strip to accommodate the molding shrinkage or expansion of the blow molded body in use. The space is formed between the bottom of the end cap and edge surface of the ornamental strip, respectively. The space is preferably determined to be in the range of 2-20 mm depending on materials and length of the blow molded body and the ornamental strip.

The end caps are attached so as to slide along with the longitudinal direction of the ornamental strip, responding to the molding shrinkage or expansion in use. The end caps may be formed of a metal selected from the group of a stainless steel, aluminum, and coated steel plate. They may be formed of a synthetic resin selected from the group of ABS resin, nylon, and polyacetals. The blow molded body may be formed of a synthetic resin, elastomer, and rubber. The synthetic resin may be polypropylene, polyvinyl chloride, and polyethylene.

A molding process for making a blow molding has the steps of preparing the ornamental strip provided with the fixture in its longitudinal direction and the end cap to be attached to both ends of the ornamental strip; keeping a space between an edge surface of the ornamental strip and bottom of the end cap; attaching the end cap slidably to the both ends of the ornamental strip; positioning the ornamental strip provided with the end cap in a die for blow molding; forming a blow molded body with a hollow interior through blow molding; and embedding the fixture of the ornamental strip and the end cap into the blow molded body.

The blow molding of the present invention has end caps slidably attached to both ends of the ornamental strip, and keeps the space which accommodates the amount of expansion between the edge surface of the ornamental strip and the bottom of the end caps, respectively. At blow molding, the end caps will allow the blow molded body to fully shrink in its longitudinal direction by inwardly sliding, thereby preventing warpage.

When using the blow molding, the ornamental strip and the blow molded body will independently expand to the change of temperature. However, the end caps slide independently as the blow molded body expands to offset the difference in expansion.

The fixture of the ornamental strip is formed in the longitudinal direction of the ornamental strip and embedded in the blow molded body. In case of longitudinal expansion, a slight slippage occurs between the fixture and the blow molded body on their contacting surfaces, preventing the formation of a gap between the blow molded body and the ornamental strip, or further separation of the ornamental strip from the blow molded body.

According to the molding process of the present invention, the excellent blow molding can be easily produced without causing warpage and without forming gaps between the ornamental strip and the blow molded body.

DESCRIPTION OF THE PREFERRED EMBODIMENT

Example 1

A blow molding and its molding process will be described referring to FIGS. 1 to 8.

Figure 2:
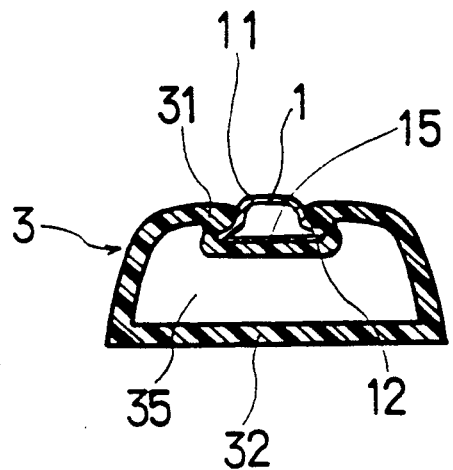
FIG. 2 is a sectional view taken on line A—A of FIG. 1.
Figure 3:
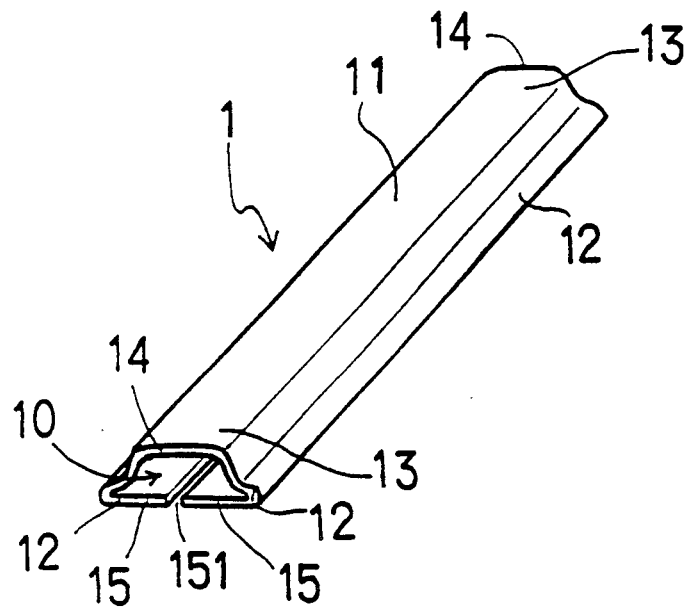
FIG. 3 is a perspective view of the ornamental strip of Example 1.

The blow molding of this example relates to moldings provided for automobiles and ships. As FIGS. 1 to 5 show, the molding of this example is composed of a blow molded body 3 with a hollow interior, an ornamental strip 1 integrally bonded to outside thereof, and an end cap 2 attached to each end 13 of the ornamental strip 1. The ornamental strip 1 has a fixture 12 provided along with the longitudinal direction. The end caps 2 are attached so as to slide in the longitudinal direction of the ornamental strip 1, keeping a space 8 between its bottom 22 and an edge surface 14 of the ornamental strip 1, respectively. The fixture 12 of the ornamental strip 1 and the end cap 2 are embedded into the blow molded body 3. As FIGS. 1 and 2 show, the blow molded body 3, as a main part of the molding, has an outer surface 31, a bottom surface 32, and a hollow interior 35 defined therebetween. As FIGS. 2 and 3 show, the ornamental strip 1 is obtained by forming the metal plate into convex-like shape through roll forming method. Its shape is tubular and composed of an ornamental surface 11, fixtures 12 at both lower sides, bottom plate 15, and a hollow interior 10 defined thereby. Edge portions 13 have the respective edge surfaces 14. A slit 151 is formed in the center of the bottom plate 15 along its longitudinal direction.

Figure 4:
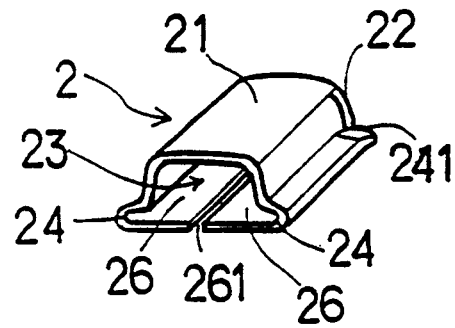
FIG. 4 is a perspective view of a front side of the end cap of Example 1.
Figure 5:
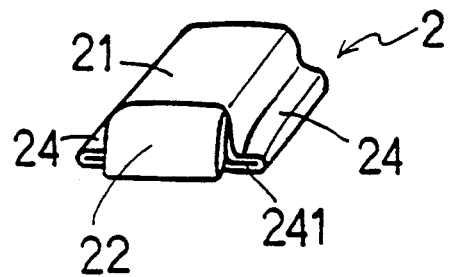
FIG. 5 is a perspective view of a rear side of the end cap of Example 1.

As FIGS. 4 and 5 show, the end cap 2 formed from a metal plate through pressing is composed of a cover portion 21, protrusions 24 at both lower sides, a bottom plate 26, an end portion 22 formed at rear side, and a hollow interior 23 defined thereby. The protrusions 24 are closed around the end portion 22. The sectional shape of the hollow interior 23 is the same as that of the ornamental strip 1.

The end cap 3 slidably engages its hollow interior with both ends 13 of the ornamental strip 1, respectively. As FIG. 1 shows, the space 8 for accommodating expansion is formed between the end portion 22 of the end cap 2 and the edge surface 14 of the ornamental strip 1.

As FIGS. 1 and 2 show, the fixture 12 at lower sides of the ornamental strip 1 and the bottom plate 15 are disposed on the outer surface 31 of the blow molded body 3. The fixture 12 of the ornamental strip 1 and the end cap 2 are embedded into the blow molded body 3, leaving the ornamental surface 11 unembedded.

The molding process for producing the above molding will be described referring to FIGS. 6 to 9.

Figure 6:
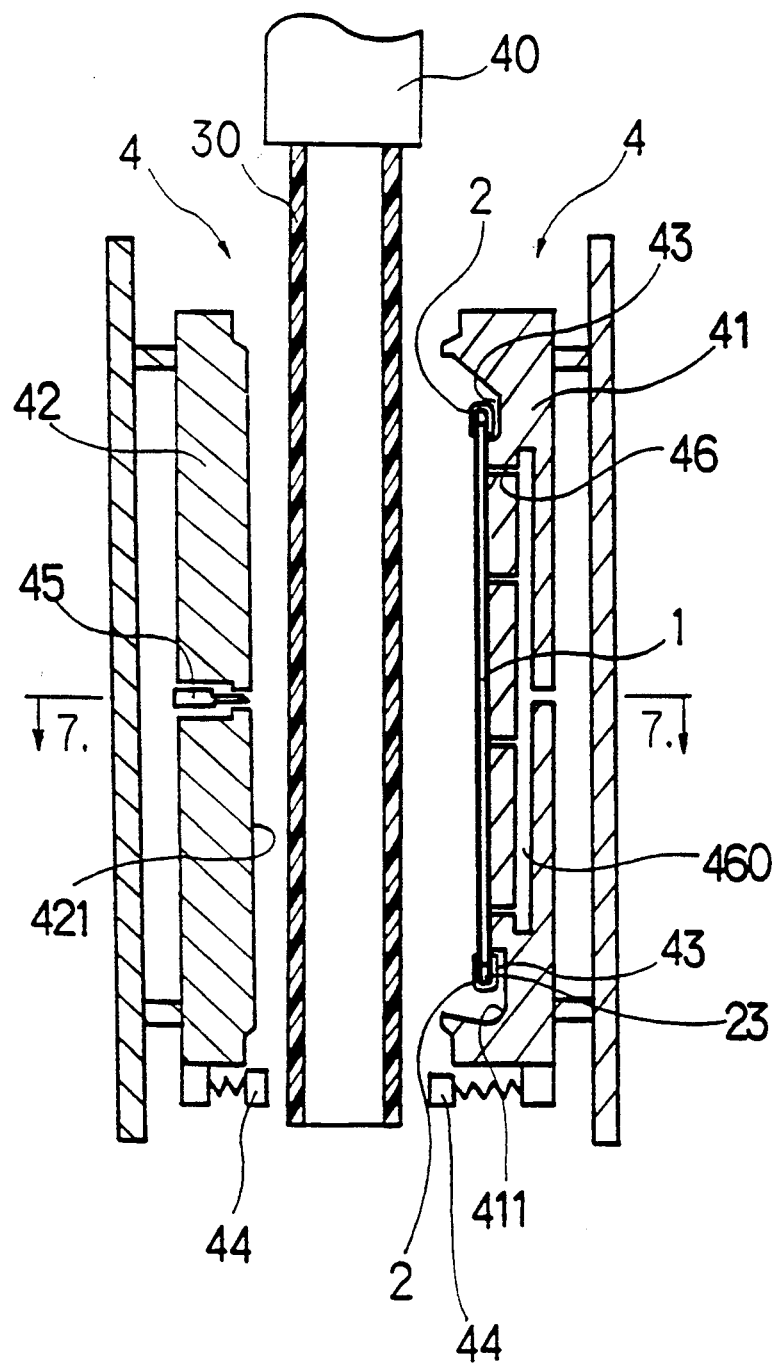
FIG. 6 is a sectional view of a die for blow molded body of Example 1.

As FIG. 6 shows, a die 4 used for blow molding is composed of a cavity block 41 and a core plate 42. A plurality of vent holes 46 are provided with the cavity block 41 for fixing the ornamental strip 1 by subjecting it to vacuum. The vent holes 46 are communicated with a suction pump (not shown) via an air passage 460. When executing blow molding, the end caps 2 are attached to both ends 13 of the ornamental strip 1. They are disposed and held within a cavity 411 of the cavity block 41 by contacting the ornamental surface 11 of the ornamental strip 1 to the vent holes 46 to be subjected to vacuum as FIGS. 6 and 7 show.

Then a clearance 43 is defined between the cavity 411 and the end cap 2. Another clearance 412 is defined between the fixture 12 of the ornamental strip 1 and the cavity 411.

Figure 7:
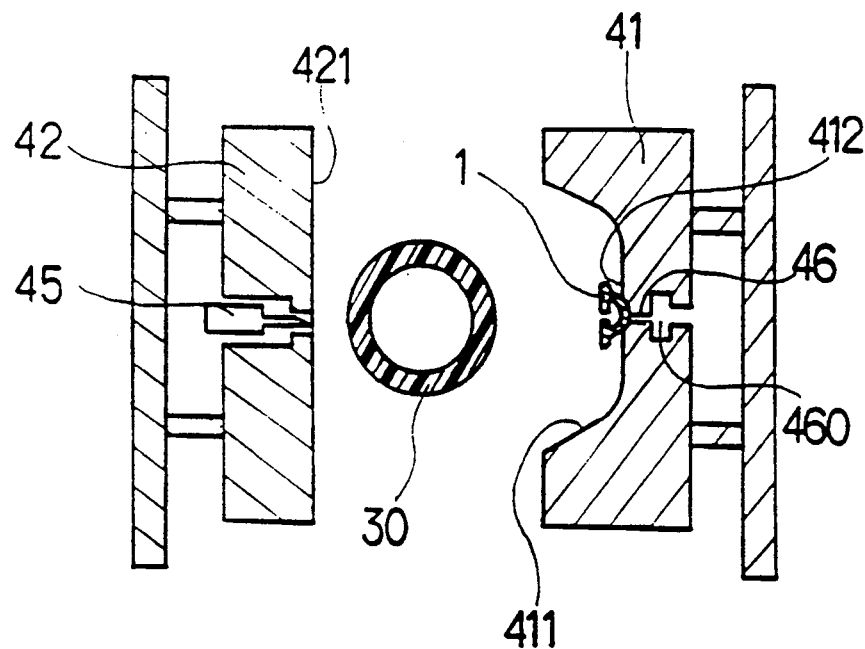
FIG. 7 is a sectional view taken on line B—B of FIG. 6.
Figure 9:
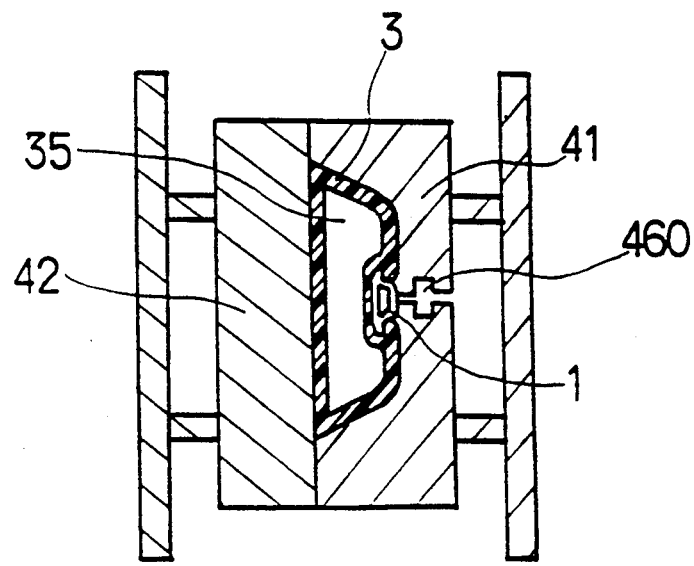
FIG. 9 is a sectional view taken on line C—C of FIG. 8.
Figure 8:
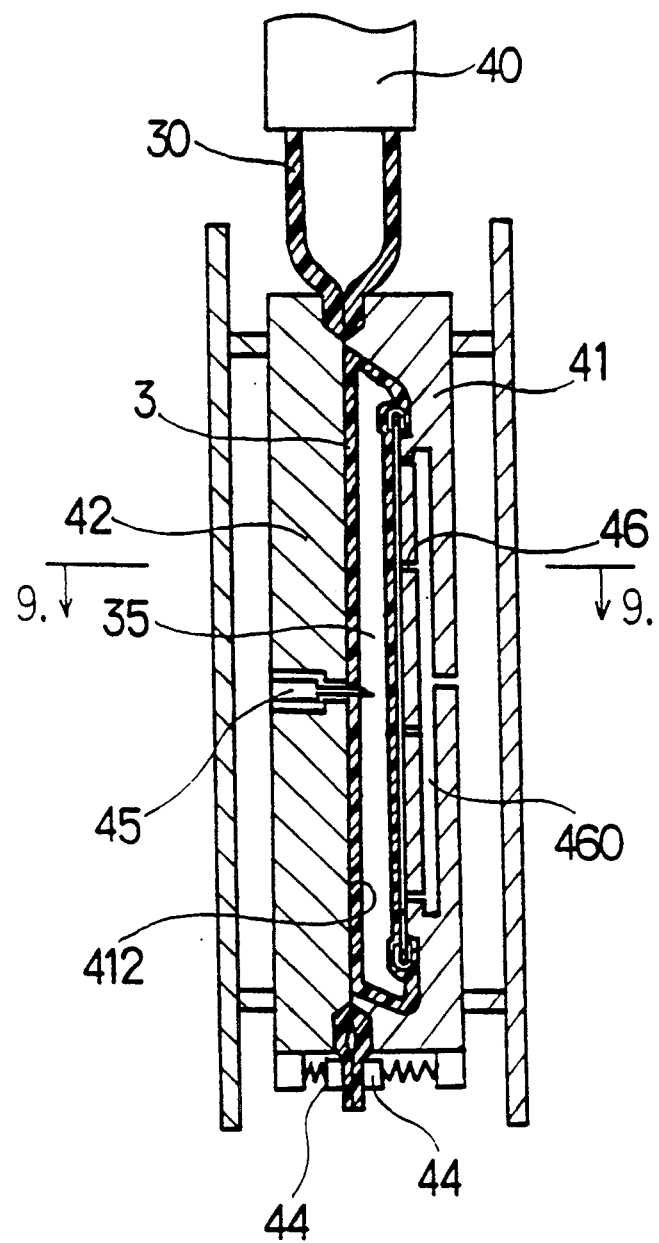
FIG. 8 is a sectional view of the die for the blow molded body after being molded in Example 1.

As FIGS. 6 and 7 show, parison 30 is extruded from a die head 40 of a blow molding apparatus down into the die 4 when it is opened. Then as FIGS. 8 and 9 show, the die 4 of the cavity block 41 and the core plate 42 is closed, and end portion of the parison 30 is also closed with a parison pincher 44.

A needle 45 is further pierced through a wall of the parison 30, into which a compressed air is blown. By this, the parison 30 has its outer peripheral surface brought into contact with the inner surfaces of both cavity block 41 and core plate 42. At this time, the clearances 43 and 412 in the die 4 are also filled with the parison 30. As a result, the fixture 12 of the ornamental strip 1 and peripheral surface of the end cap 2 are covered with the parison 30, leaving the ornamental surface 11 of the ornamental strip 1 uncovered. Then the die 4 is cooled to allow removal of the a blow molding. Residual burrs are removed from the molding, resulting in finished molding as shown in FIGS. 1 and 2.

The molding of this example is provided with the end caps 2 slidably attached to both ends 13 of the ornamental strip 1 shown in FIG. 1, and a space 8 formed between the edge surface 14 of the ornamental strip 1 and the end portion 22 of the end cap 2. Even though the blow molded body 3 shrinks in its longitudinal direction at blow molding, the end cap 2 slides inwardly to allow the blow molded body to fully shrink, thereby preventing warpage. Even though the ornamental strip 1 and the blow molded body 3 independently expand to the change of temperature when using the molding, the end cap 2 slides to offset the difference of the expansion in the same way as described above.

The fixture 12 of the ornamental strip 1 is fixed to be embedded into the blow molded body 3 as shown in FIG. 2, and formed in longitudinal direction. This causes slight slippage between the fixture 12 and the blow molded body 3 at the respective expansion on their contacting surfaces, thereby preventing to cause a gap between the blow molded body 3 and the ornamental strip 1, or further separation of the ornamental strip 1 from the blow molded body 3.

Example 2

The present example describes the molding which uses an ornamental strip 6 formed of a synthetic resin as FIGS. 10 to 14 show.

Figure 12:
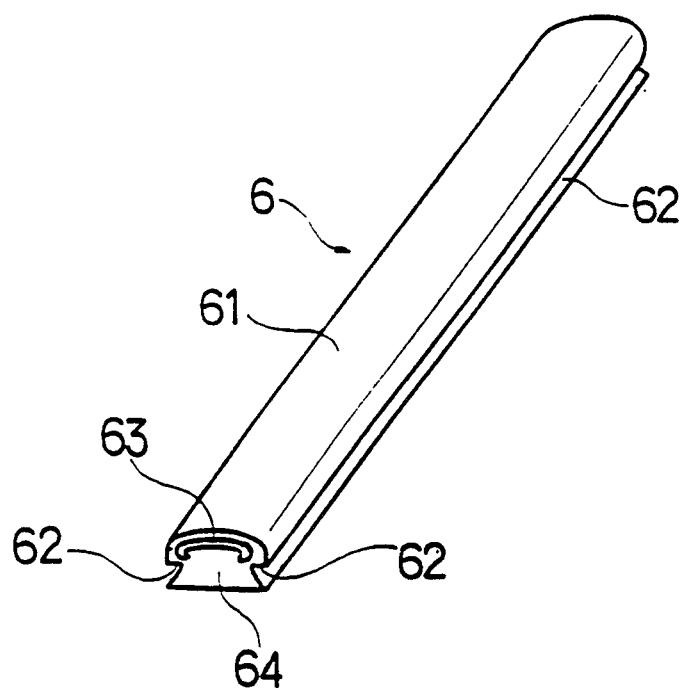
FIG. 12 is a perspective view of the ornamental strip of Example 2.
Figure 13:
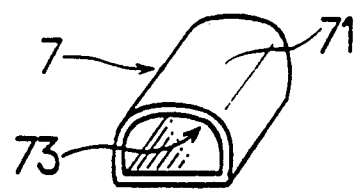
FIG. 13 is a perspective view of a front side of an end cap of Example 2.
Figure 14:
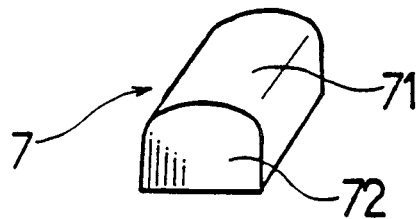
FIG. 14 is a perspective view of a rear side of the end cap of Example 2.

As FIG. 12 shows, the ornamental strip 6 is formed of a transparent synthetic resin and contains an ornamental lustrous film 63 therein. The lustrous film 63 may be formed of an aluminum foil, and a synthetic resin film deposited with aluminum powder. The ornamental strip 6 is composed of an ornamental portion 61 on its outer surface, and fixtures 62 on both sides.

Figure 10:
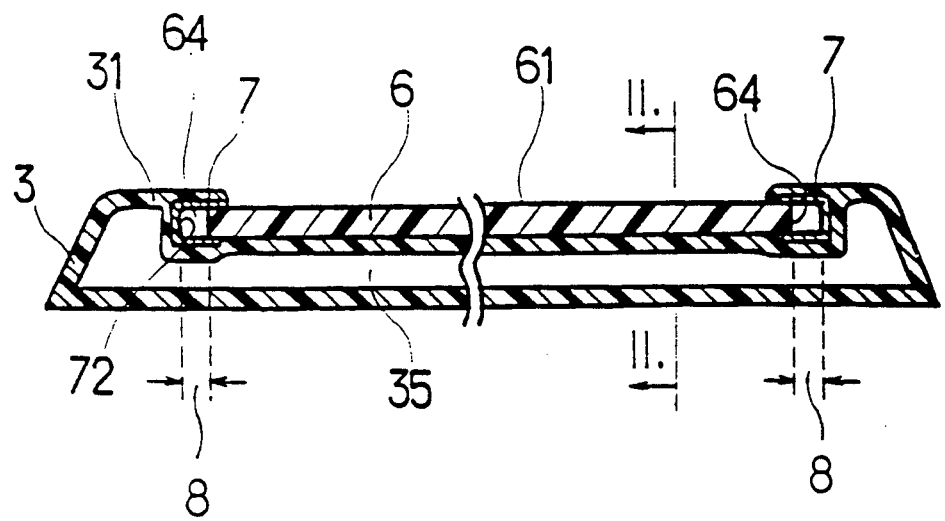
FIG. 10 is a sectional view of the molding of Example 2.
Figure 11:
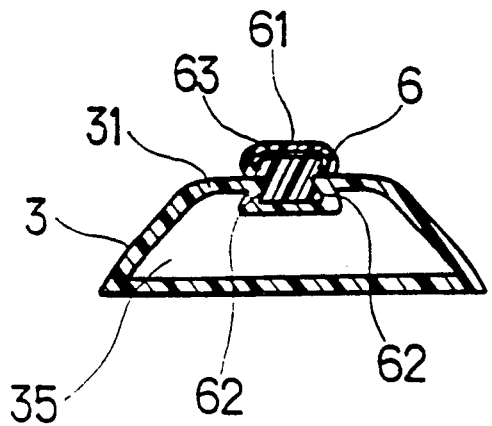
FIG. 11 is a sectional view taken on line D—D of FIG. 10.

As end cap 7 is formed of a metal, and composed of cover portion 71, bottom portion 72, and a hollow interior 73. As FIG. 10 shows, the end cap 7 is slidably attached to both ends of the ornamental strip 6 in the hollow interior 73. A gap 8 is formed and kept between the bottom portion 72 of the end cap 7 and the edge surface 64 of the ornamental strip 6. Other constructions are the same as those of Example 1. In this example, the same effects as those of Example 1 can be obtained.

Example 3

The molding obtained according to Example 1 and its molding process will be described in detail.

In this example, the ornamental strip 1 and end cap 2 are formed of stainless steels with its coefficient of linear expansion of about 1 to $2 \times 10^{-5}$ cm/cm°C. The blow molded body 3 is formed of a polypropylene resin. The obtained molding has its length of 100 cm, width of 8 cm, and linear expansion coefficient of $1 \times 10^{-4}$ cm/cm°C.

The blow molded body 3 is produced through blow molding process initially at 220° C., and then cooled down to about 20° C. The amount of the molding shrinkage which occurs at this time is about 20 mm. Setting the minimum environmental temperature for use to −40° C., the amount of the molding shrinkage resulting from the change of temperature from 20° C. to −40° C. will be about 6 mm.

When attaching the end cap 2 to the ornamental strip 1, the space 8 is designed to have its length of 13 mm or more on both sides, considering total length of expansion of 26 mm. As aforementioned, the ornamental strip 1 and the end cap 2 integrally bonded with the space formed is disposed within the die 4 for blow molding.

The coefficient of linear expansion of the ornamental strip 1 is smaller than that of the blow molded body 3. The molding shrinkage of the blow molded body 3 in the course of blow molding, thus, will become larger than that of the ornamental strip 1. The end cap 2 slides inwardly to decrease the space 8 from 13 mm to 3 mm.

Assuming that the molding is to be used in the chilly area, the molding shrinkage was measured by decreasing the temperature from 20° to −40° C. The measurement result shows that the space 8 is decreased by 3 mm, respectively. When increasing the temperature from −40° C. to 20° C. again, the initial condition is smoothly restored.

The above molding never caused warpage at blow molding. in case of decreasing the temperature from 20° C. to −40° C. and vice versa, no gap or separation occurred between the ornamental strip 1 and the blow molded body 3.

While the invention has been described with reference to the example, it is to be understood that modifications or variations may be easily made by a person of ordinary skill in the art without departing from the scope of this invention which is defined by the appended claims.

What is claimed is:

1. A blow molding comprising:
   a blow molded body with a hollow interior formed therein;
   an ornamental strip formed with an ornamental surface attached to a bottom plate in its longitudinal direction by at least one fixture, which strip is embedded in an outer surface of said blow molded body; and
   an end cap attached to each end of said ornamental strip and embedded in said outer surface of said blow molded body, each of said end caps being in sliding contact with said ornamental strip and positioned in such a manner at each end of the ornamental strip so as to provide a space between the bottom of the end cap and the terminal edge of the ornamental strip.

2. A blow molding as in claim 1, wherein said ornamental strip is a metal selected from the group consisting of a stainless steel, aluminum and chrome coated plate.

3. A blow molding as in claim 1, wherein said ornamental strip is a synthetic resin selected from the group consisting of polyvinyl chloride, acrylic resin and ionomer resin.

4. A blow molding as in claim 1, wherein said ornamental strip is formed of a transparent synthetic resin containing an ornamental lustrous film therein.

5. A blow molding as in claim 4, wherein said lustrous film is an aluminum foil.

6. A blow molding as in claim 4, wherein said lustrous film is a film with an aluminum powder therein.

7. A blow molding as in claim 1, wherein said ornamental strip is embedded into said blow molded body leaving its ornamental surface unembedded.

8. A blow molding as in claim 1, wherein said end cap is formed of a metal selected from the group consisting of a stainless steel, aluminum and a plated steel.

9. A blow molding as in claim 1, wherein said end cap is formed of a synthetic resin selected from the group consisting of an ABS resin, nylon and polyacetal.

10. A blow molding as claimed in claim 1, wherein said blow molding is an automobile bumper having a hollow interior.

11. A blow molding as in claim 1, wherein said blow molded body is formed of a synthetic resin.

12. A blow molding as in claim 11, wherein said synthetic resin is selected from the group consisting of polypropylene, polyvinyl chloride and polyethylene.

13. A blow molding as in claim 11, wherein said synthetic resin is an elastomer.

14. A blow molding as in claim 1, wherein said bottom plate has a slit in its center which divides the bottom plate, said slit traversing the longitudinal direction of the bottom plate.

15. A blow molding as in claim 1, wherein said space between the bottom of the end cap and the terminal edge of the ornamental strip ranges from 2 to 20 mm.

* * * * *